(12) United States Patent
Silberman (10) Patent No.: US 8,065,889 B1
(45) Date of Patent: Nov. 29, 2011

(54) ADJUSTABLE SUPPORT STRUCTURE AND DRAINAGE SYSTEM FOR PORTABLE ICE CHEST

(76) Inventor: Louis Z. Silberman, Asheville, NC (US)

(*) Notice: Subject to any disclaimer, the term of this patent is extended or adjusted under 35 U.S.C. 154(b) by 558 days.

(21) Appl. No.: 12/360,936

(22) Filed: Jan. 28, 2009

Related U.S. Application Data (60) Provisional application No. 61/100,322, filed on Sep. 26, 2008.

(51) Int. Cl.
*F25D 3/08* (2006.01)
(52) U.S. Cl. ........................ 62/457.7; 62/459
(58) Field of Classification Search ............... 62/457.1, 62/457.2, 457.7, 371, 372, 420, 425, 459; 220/219, 571, 628, 915.2; 312/130, 229, 312/351, 408
See application file for complete search history.

(56) References Cited

U.S. PATENT DOCUMENTS

| | | | |
|---|---|---|---|
| 2,663,157 A | 12/1953 | Laramy | |
| 3,791,547 A * | 2/1974 | Branscum | 220/592.2 |
| 4,424,687 A | 1/1984 | Morgan | |
| 4,565,074 A | 1/1986 | Morgan | |
| 4,577,475 A * | 3/1986 | Herrera | 62/457.1 |
| 4,798,060 A * | 1/1989 | Long et al. | 62/310 |
| 4,823,554 A * | 4/1989 | Trachtenberg et al. | 62/3.3 |
| 4,841,742 A * | 6/1989 | Biby | 62/420 |
| 5,090,214 A * | 2/1992 | LoGioco | 62/457.7 |
| 5,301,508 A * | 4/1994 | Kahl et al. | 62/3.62 |
| 5,319,937 A * | 6/1994 | Fritsch et al. | 62/3.62 |
| 5,367,879 A * | 11/1994 | Doke et al. | 62/3.6 |
| 5,437,165 A | 8/1995 | White et al. | |
| 5,605,056 A * | 2/1997 | Brown et al. | 62/457.4 |
| 5,685,165 A * | 11/1997 | Bigelow, Jr. | 62/420 |
| 5,781,853 A * | 7/1998 | Johnson | 455/351 |
| 6,050,663 A | 4/2000 | Schoellmann | |
| 6,122,928 A * | 9/2000 | Strobel et al. | 62/398 |
| 6,126,124 A | 10/2000 | Wagner | |
| 6,153,857 A * | 11/2000 | Gunnels | 219/386 |
| 6,626,006 B1 | 9/2003 | Tedder | |
| 6,763,959 B2 | 7/2004 | Tedder | |
| 7,246,784 B1 | 7/2007 | Lopez | |
| 7,313,927 B2 | 1/2008 | Barker | |
| 7,313,928 B2 | 1/2008 | Girard | |
| 7,389,608 B1 * | 6/2008 | MacKay | 43/57 |
| 7,954,183 B2 * | 6/2011 | Cawthon | 4/650 |
| 2004/0069009 A1 * | 4/2004 | Tedder | 62/457.7 |
| 2006/0225453 A1 * | 10/2006 | Martello | 62/420 |
| 2007/0044503 A1 * | 3/2007 | McCarrell | 62/420 |
| 2007/0186579 A1 | 8/2007 | Barker | |
| 2008/0066484 A1 * | 3/2008 | Blackstone | 62/421 |
| 2008/0148766 A1 | 6/2008 | Wickline | |
| 2008/0271468 A1 * | 11/2008 | Monroe | 62/89 |
| 2009/0031750 A1 * | 2/2009 | Whillock, Sr. | 62/344 |

* cited by examiner

*Primary Examiner* — Mohammad Ali
(74) *Attorney, Agent, or Firm* — Carter & Schnedler, P.A.

(57) ABSTRACT

An adjustable support structure for supporting food items above melt water which accumulates in the bottom of an insulated portable ice chest. A horizontal deck supports food and ice within the ice chest above the ice chest bottom so that a volume for melt water is defined between the ice chest bottom and the horizontal deck. In some embodiments, to facilitate draining the ice chest in situ, a drain water suction pick up tube is provided having a lower portion extending downwardly from the horizontal deck into the volume. In some embodiments, the horizontal deck includes a generally rectangular main portion and a pair of adjustable wings, with supports under the main portion for positioning the horizontal deck a distance above the ice chest bottom.

20 Claims, 7 Drawing Sheets

ADJUSTABLE SUPPORT STRUCTURE AND DRAINAGE SYSTEM FOR PORTABLE ICE CHEST

CROSS-REFERENCE TO RELATED APPLICATION

The benefit of U.S. Provisional Patent application Ser. No. 61/100,322, filed Sep. 26, 2008 is claimed.

BACKGROUND OF THE INVENTION

The invention relates generally to platforms for use in combination with insulated portable ice chests, for the purpose of supporting food items above melt water which accumulates in the bottom of the ice chest.

Thus, in the absence of a platform, as ice melts and water pools at the bottom of the ice chest, food items become submerged in cold water. Food can become wet and soggy. Water seeps into loosely-capped bottles and jars. Reaching into icy water to retrieve food items is not pleasant. Additional packaging to waterproof food is wasteful and time-consuming. Moreover, ice chest drains can be rendered useless due to obstruction by plastic bags or food.

Accordingly, a variety of platforms, also termed ice racks, trays, or inserts, have been proposed, for supporting food and ice within the ice chest above the ice chest bottom.

SUMMARY OF THE INVENTION

In one aspect, an adjustable support structure is provided for use in combination with a portable ice chest of the type having a bottom, four walls and a top opening with a cover. The support structure includes a horizontal deck for supporting food and ice within the ice chest above the ice chest bottom so that a volume for melt water is defined between the ice chest bottom and the horizontal deck. The horizontal deck in turn includes a generally rectangular main portion having four side edges, and a pair of adjustable wings extending past two adjacent side edges of the main portion. Supports are provided under the main portion for positioning the horizontal deck a distance above the ice chest bottom.

In another aspect, a structure is provided for use in combination with a portable ice chest of the type having a bottom, four walls and a top opening with a cover. The support structure includes a horizontal deck for supporting food and ice within the ice chest above the ice chest bottom so that a volume for melt water is defined between the ice chest bottom and the horizontal deck. Supports are provided under the horizontal deck for positioning the horizontal deck a distance above the ice chest bottom. A drain water suction pick up tube has a lower portion extending downwardly from the horizontal deck into the volume, the lower portion having an end which is spaced above the ice chest bottom during use.

In yet another aspect, a combination is provided, of a portable ice chest having a bottom, four walls and a top opening with a cover; and an adjustable support structure including a horizontal deck for supporting food and ice within the ice chest above the ice chest bottom so that a volume for melt water is defined between the ice chest bottom and the horizontal deck. The horizontal deck in turn includes a generally rectangular main portion having four side edges, and a pair of adjustable wings extending past two adjacent side edges of the main portion. Supports are provided under the main portion for positioning the horizontal deck a distance above the ice chest bottom. A drain water suction pick up tube has a lower portion extending downwardly from the horizontal deck into the volume, the lower portion having an end which is spaced above the ice chest bottom during use, and an upper portion which extends upwardly from the horizontal deck. A drain connection tube extends through one of the side walls of the ice chest near the top opening. A riser tube is connected to the nipple, extends upwardly within the ice chest, and is connected to the drain connection tube.

DETAILED DESCRIPTION

Figure 1:
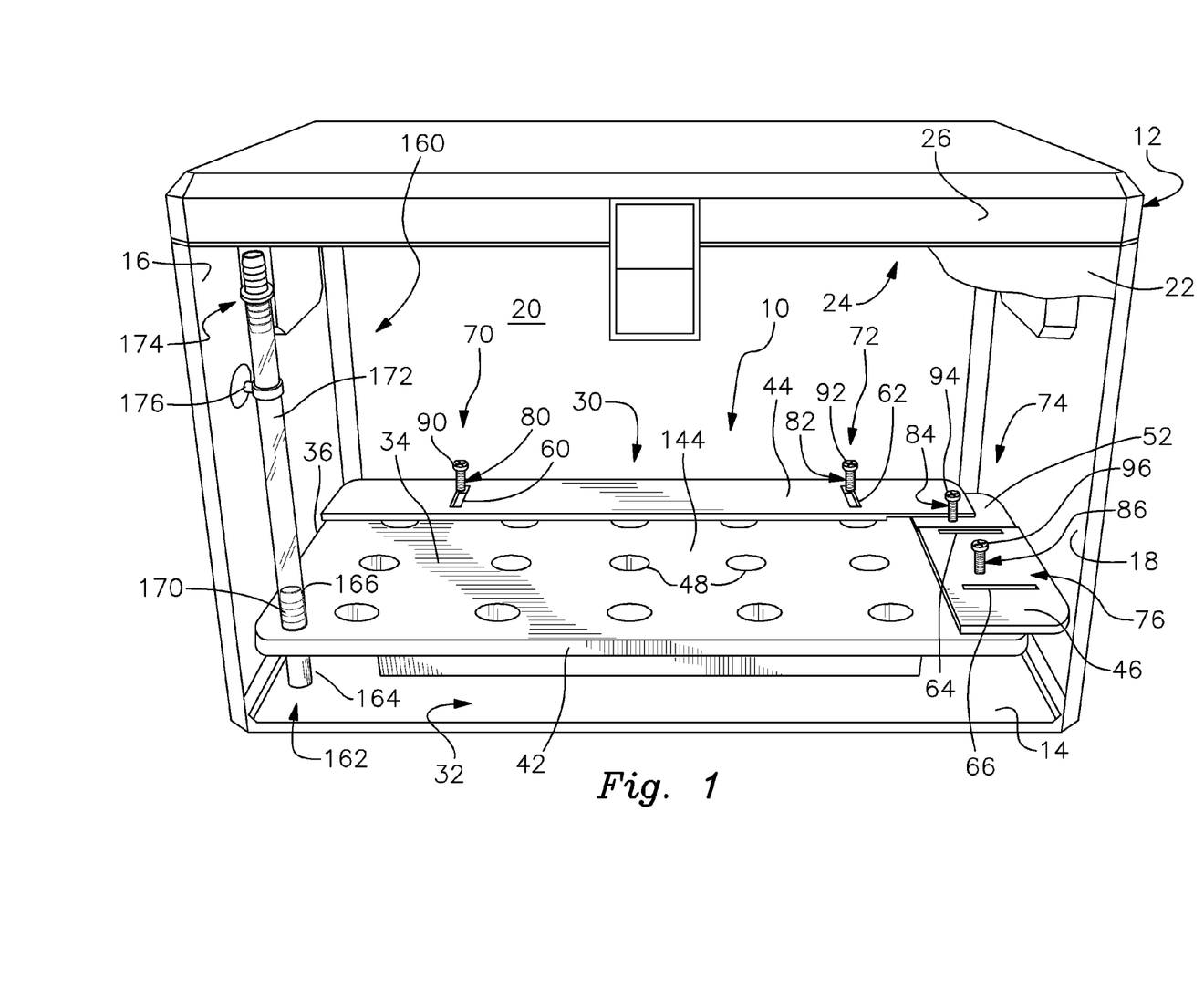
FIG. 1 is a three dimensional representation of a portable ice chest including an adjustable support structure embodying the invention.

Referring first to FIG. 1, an adjustable support structure 10 embodying the invention is located within an insulated portable ice chest 12. The portable ice chest 12 is representative of any one of a variety of conventional portable ice chest designs, which are available of a variety of styles and sizes, both with and without drains. The portable ice chest 12 more particularly has a bottom 14 and four walls 16, 18, 20 and (including side walls 16 and 18, rear wall 20 and front wall 22 shown partially broken away in FIG. 1). The portable ice chest 12 includes a top opening 24 as well as a cover 26.

Referring to FIGS. 2-6, in addition to FIG. 1, the adjustable support structure 10 embodying the invention more particularly includes a horizontal deck 30 for supporting food and ice (not shown) within the ice chest 12 a distance above the ice chest bottom 14, thereby defining a volume 32 or space 32 for melt water (not shown) below the horizontal deck 30, between the ice chest bottom 14 and the horizontal deck 30. Thus, the horizontal deck 30 may be viewed as a "false bottom" of the insulated portable ice chest 12, on which food and drinks (not shown) are supported, along with ice (not shown), which may be packed above, below, or around the food and drinks as desired.

Figure 2:
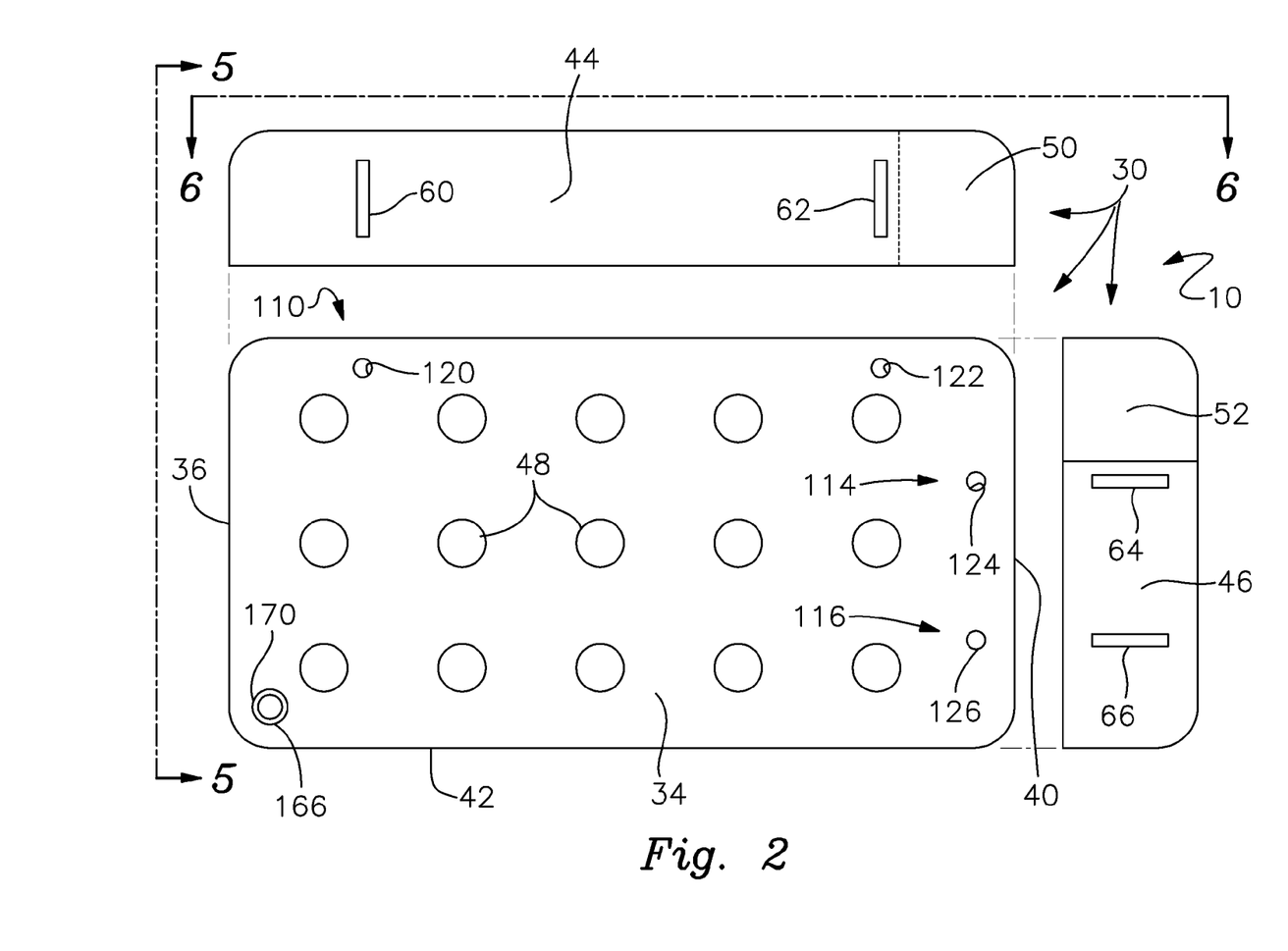
FIG. 2 is an exploded top view of the FIG. 1 support structure.
Figure 3:
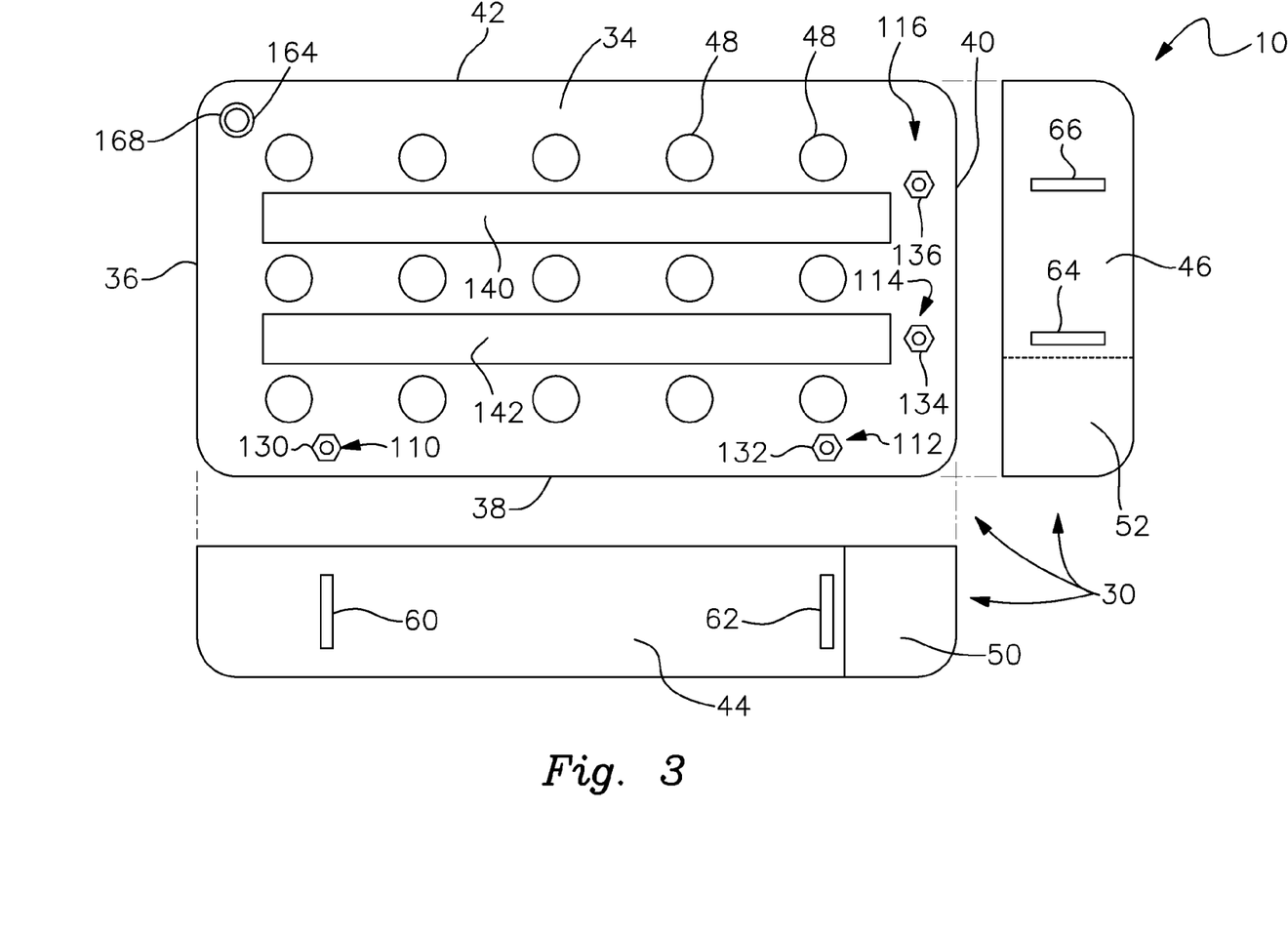
FIG. 3 is an exploded bottom view of the FIG. 1 support structure.

The horizontal deck 30 includes a generally rectangular main portion 34 having four side edges 36, 38, 40 and 42, as well as a pair of adjustable wings 44 and 46 which are positioned over the main portion 34 and which extend past two adjacent side edges of the main portion 34, in the illustrated embodiment past side edges 38 and 40, respectively. The adjustable wings 44 and 46 serve to prevent food and ice from falling over the edges of the main portion 34. In effect, one of the wings (wing 44) adjusts the width, and the other of the wings (wing 46) adjusts the length. The horizontal deck 30, and in particular the main portion 34 thereof, is substantially solid, but with a plurality of drainage apertures 48 to facilitate the flow of melt water into the volume 32 or space 32 below the deck 30.

The adjustable wings 44 and 46 overlap the main portion 34 of the horizontal deck 30 and are generally coplanar with each other. The adjustable wings 44 and 46 have corresponding or matching rabbets 50 and 52 at one end of each wing 44 and 46 so that the wings 44 and 46 can overlap at their ends while remaining generally coplanar.

To provide clamping and adjustment capability, slotted apertures 60, 62, 64 and 66 are provided in the adjustable wings 44 and 46, and fasteners, generally designated 70, 72, 74 and 76, pass through the slotted apertures 60, 62, 64 and 66. The fasteners 70, 72, 74 and 76 more particularly take the form of machine screws 80, 82, 84 and 86 having heads 90, 92, 94 and 96 which are above the adjustable wings 44 and 46, and threaded portions 100, 102, 104 and 106 which pass through the slotted apertures 60, 62, 64 and 66 to engage threads 110, 112, 114 and 116. The threads 110, 112, 114 and 116 may take the form either of threaded apertures 120, 122, 124 and 126 in the main portion 34 of the horizontal deck 30 (if material strength permits) or nuts 130, 132, 134 and 136 carried by the main portion 34 of the horizontal deck 30.

During initial installation, the machine screws 80, 82, 84 and 86 are assembled loosely or loosened (if previously tightened). The adjustable wings 44 and 46 are then moved in or out as required so that the horizontal deck 30 fits snugly within the portable ice chest 12. The machine screws 80, 82, 84 and 86 are subsequently tightened, securely clamping the adjustable wings 44 and 46 against the top of the horizontal deck 30 main portion 34.

The adjustable support structure 10 is itself provided in a plurality of sizes, to accommodate, in conjunction with the adjustable wings 44 and 46, most typical sizes of consumer portable ice chests.

Figure 4:
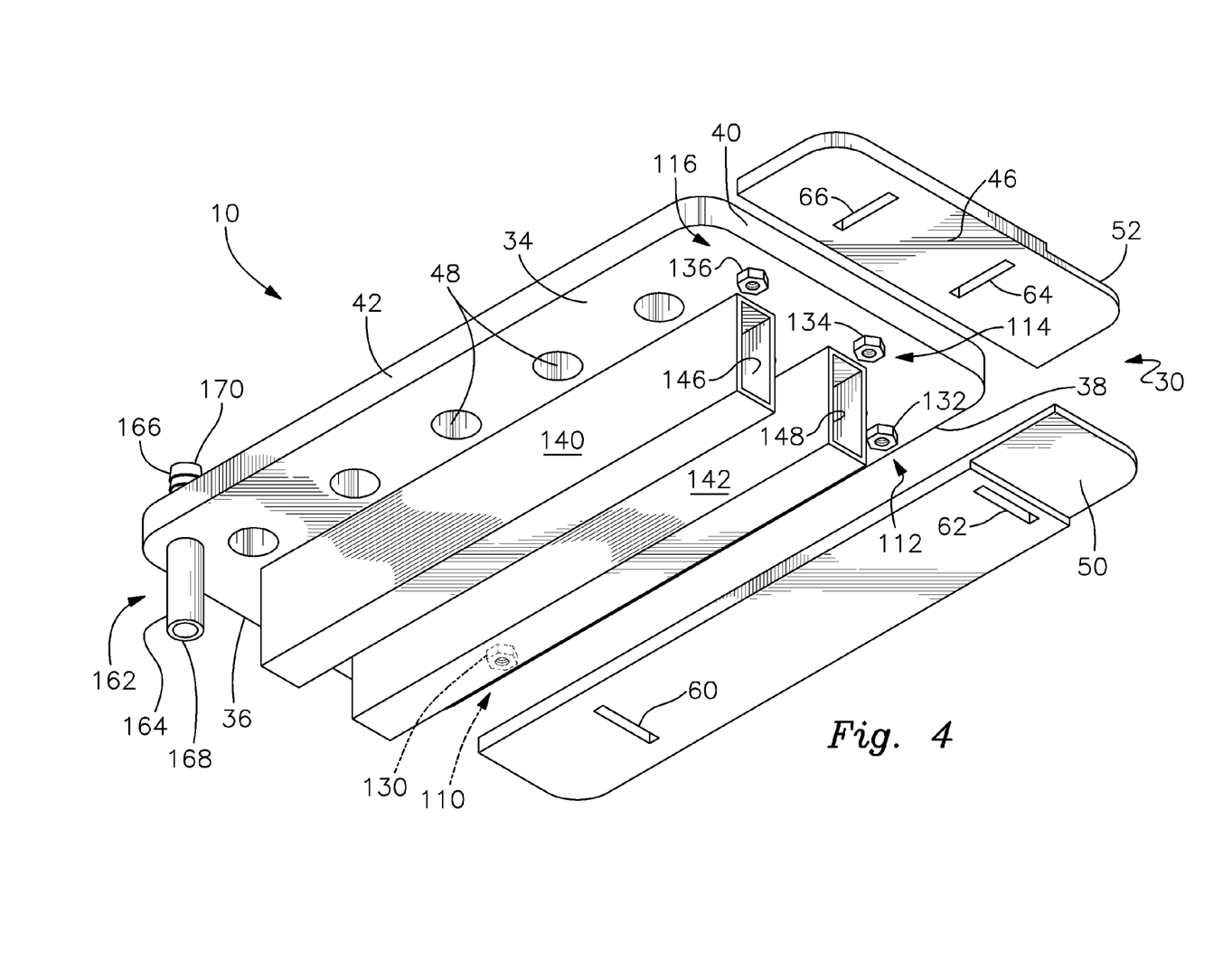
FIG. 4 is a three dimensional view, partially exploded, from the underside of the support structure of FIG. 1.
Figure 5:
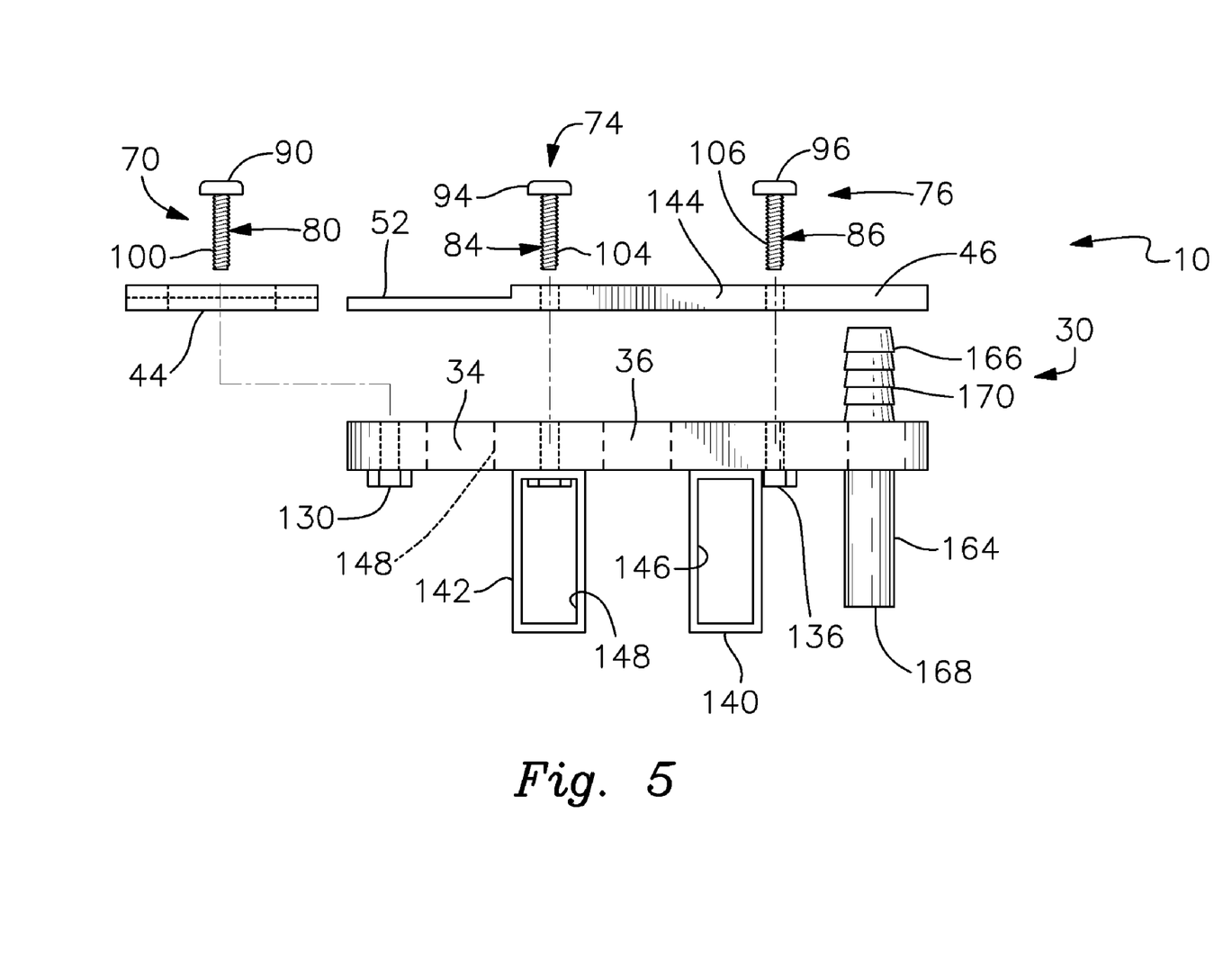
FIG. 5 is an elevational view generally on line 5-5 of FIG. 2, but also depicting fasteners employed.
Figure 6:
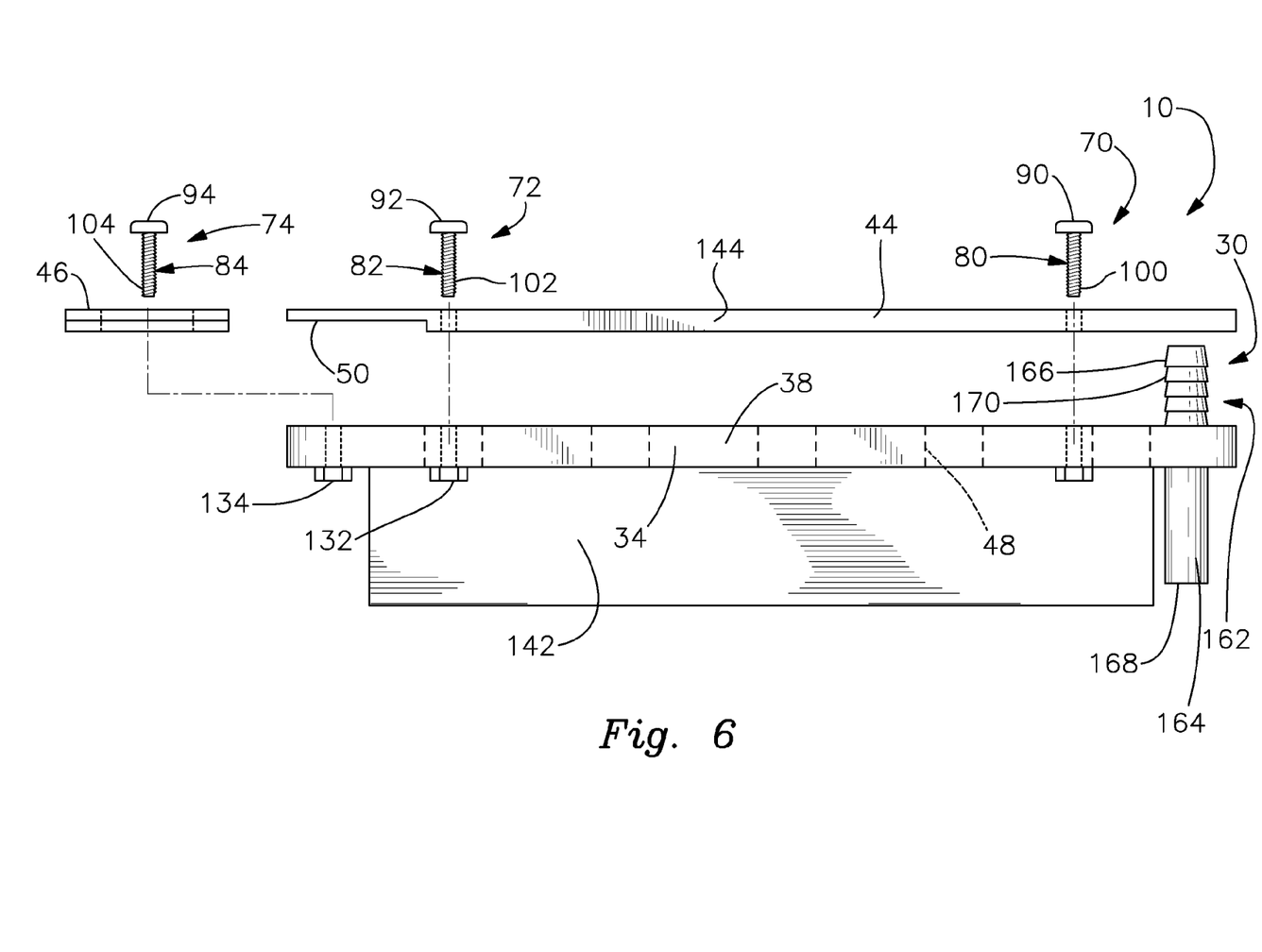
FIG. 6 is an elevational view generally on line 6-6 of FIG. 2, but also depicting fasteners employed.

The support structure 10 additionally includes supports 140 and 142 under the main portion 34 of the horizontal deck 30 to position the horizontal deck 30 above the ice chest bottom 14, thereby defining the volume 32 or space 32 for melt water as described hereinabove. The supports 140 and 142 are configured so as to provide direct structural support for a intermediate portion 144 of the main portion 34, in contrast to being, for example, located at the periphery or at corners of the main portion 140. Thus, the main portion 34 of the horizontal deck 30 is able to support substantial loads, without requiring undue beam strength.

In the illustrated embodiment, the supports 140 and 142 are elongated, and, more particularly, comprise tubing which has a rectangular cross-section. As a result, hollow interiors 146 and 148 of the supports 140 and 142 are available to store melt water. The supports 140 and 142 accordingly provide structural support, without unduly displacing the available storage volume for melt water.

In addition to providing direct structural support for the main portion 34 of the horizontal deck, the elongated supports 140 and 142 serve to distribute the combined weight of food and ice over a significant portion of the bottom 14 of the ice chest 12.

The main portion 34 of the deck 30 and supports 140 and 142 may be constructed as a single piece, preferably molded plastic. Alternatively, the supports 140 and 142 can be attached to the underside of the main portion 134 by any appropriate methods. Examples are employing a permanent, waterproof adhesive, or by heat-fusing the various pieces together. Another alternative is screws (not shown) inserted from above the main portion 34, and countersunk. Preferably, the horizontal deck 30, including the main portion 34 and supports 140 and 142, in made of plastic material. The thickness of the main portion 34 is determined by the strength of the particular material employed.

Relatively smaller models employ two supports 140 and 142 as illustrated, and relatively thinner horizontal deck main portions 34. Larger models may employ additional supports (not shown) under the main portion 34.

Another aspect of the invention is a drainage system, generally designated 160. Although some portable ice chests include drain plugs, in order to drain melted ice water a potentially heavily-packed ice chest must sometimes be physically removed from a confined location (e.g. the back of a vehicle), held at an angle, and then returned to its original location. This can take considerable effort, and may require more than one person to accomplish. Moreover, there is a risk of leakage with a drain plug at the bottom of an ice chest.

Accordingly, embodiments of the invention include the drainage system 160. The drainage system 160 more particularly includes a drain water suction pick up tube 162 having a lower portion 164 which extends downwardly from the horizontal deck 32 into the volume 32 for storing melt water, and an upper portion 166 which extends upwardly from the horizontal deck 30. In the illustrated embodiment, the lower portion 164 and the upper portion 166 are integrally molded as part of the main portion 34 of the horizontal deck 30. Alternatively, an aperture may be provided in the horizontal deck main portion 34, and a suction pick up tube including the lower portion 164 and the upper portion 166 inserted through the aperture and secured therein.

The lower portion 164 of the suction pick up tube 162 has an end 168 which, during use, is spaced above the ice chest bottom 14. Thus, the length of the lower portion 164 of the suction pick up tube 162 is less than the height of the supports 140 and 142 under the main portion 34.

In the illustrated embodiment, the upper portion 166 takes the form of a nipple 170 with annular barbs to which a riser tube 172 is connected. A double-ended nipple 174 with annular barbs is fitted to the upper end of the riser tube 172 for selective attachment to a siphon hose (not shown), for example. The riser tube 172 preferably is secured to the side wall 16 of the portable ice chest 12 by means of a suction cup retainer 176.

To drain melt water from the portable ice chest when required, the cover 26 is opened and a siphon tube (not shown) or other suction device is connected to the nipple 174 at the top of the riser tube 172. The siphon hose is conventional and may include a pumping device (not shown) for initiating siphoning action. Having the drain point located at the top of the ice chest 12 rather than at the bottom essentially eliminates the possibility of leakage.

Figure 7:
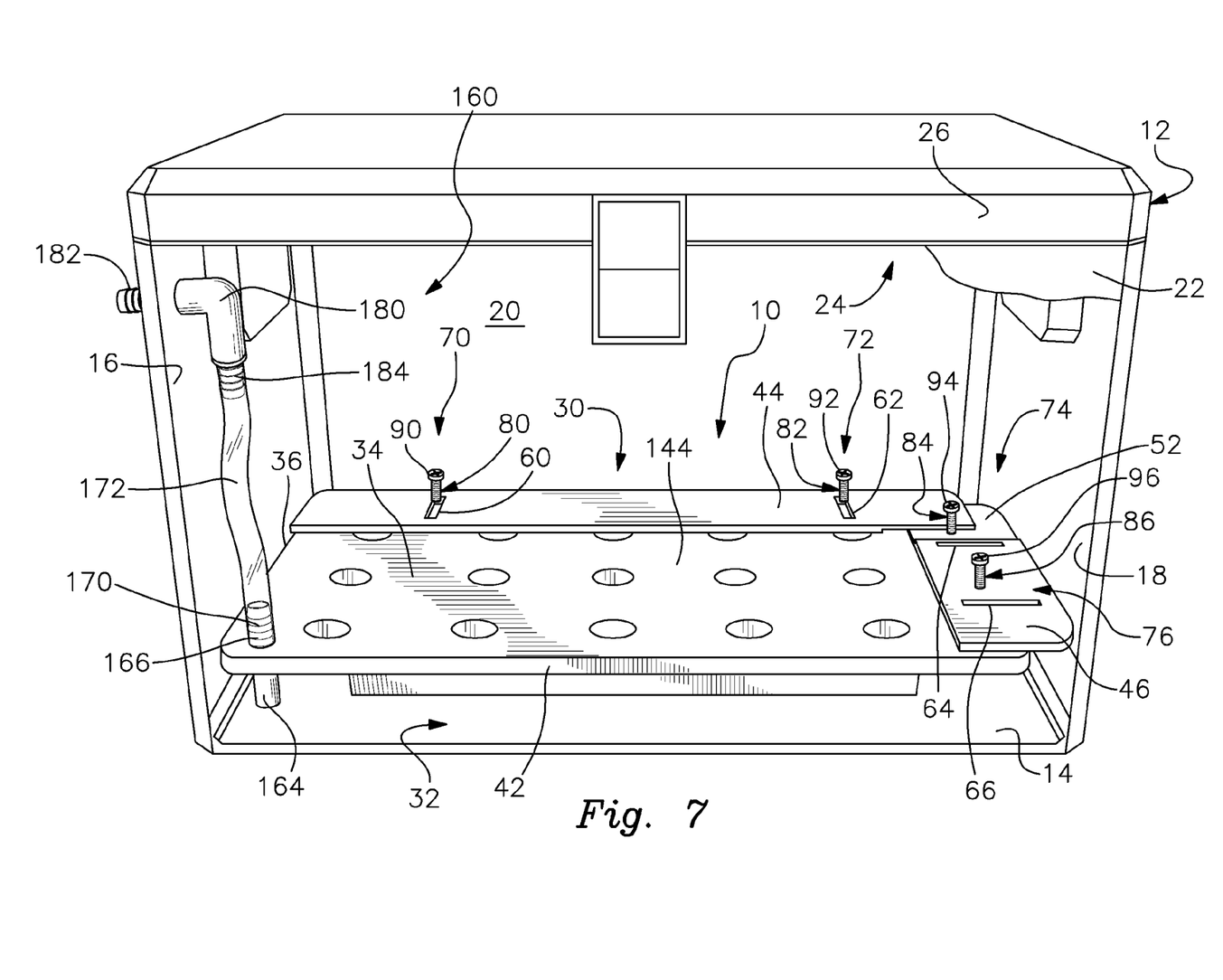
FIG. 7 is a three dimensional view similar to that of FIG. 1, illustrating another embodiment of the invention.

Referring finally to FIG. 7, an alternative embodiment of the invention is illustrated, differing from the embodiment of FIGS. 1-6 in that a suction hose attachment tube 180 terminating in a nipple 182 with annular barbs extends through the side wall 16 of the ice chest 12. In the particular embodiment illustrated in FIG. 7 the suction hose attachment tube 180 takes the form of a 90° elbow fitting 180 having another nipple 184 with annular barbs inside the ice chest 12 to which the top of the riser tube 172 is connected. In this embodiment, the melt water can be pumped or siphoned out of the volume 32 without opening the cover 26.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. An adjustable support structure for use in combination with a portable ice chest of the type having a bottom, four walls and a top opening with a cover, said support structure comprising:

a horizontal deck for supporting food and ice within the ice chest above the ice chest bottom, a volume for melt water being defined between the ice chest bottom and said horizontal deck;

said horizontal deck including
a generally rectangular main portion having four side edges, and
a pair of adjustable wings extending past two adjacent side edges of said main portion; and supports under said main portion for positioning said horizontal deck a distance above the ice chest bottom.

2. The support structure of claim 1, wherein said supports are configured so as to provide direct structural support for an intermediate portion of said main portion.

3. The support structure of claim 1, wherein said supports are elongated.

4. The support structure of claim 3, wherein said supports comprise tubing which has a rectangular cross-section.

5. The support structure of claim 1, wherein said horizontal deck is substantially solid with a plurality of drainage apertures to facilitate the flow of melt water into said volume.

6. The support structure of claim 1, wherein said adjustable wings overlap said main portion of said horizontal deck.

7. The support structure of claim 6, wherein said adjustable wings are generally coplanar and have matching rabbets to allow said wings to overlap at one end of each wing.

8. The support structure of claim 1, which further comprises fasteners which selectively clamp said adjustable wings to said main portion at a desired adjustment position.

9. The support structure of claim 8, wherein said adjustable wings include slotted adjustment apertures through which said fasteners pass.

10. The support structure of claim 9, wherein said fasteners comprise either threaded apertures in said horizontal deck main portion or nuts carried by said horizontal deck main portion, and machine screws which pass through said slotted adjustment apertures to engage said threaded apertures or nuts.

11. The support structure of claim 1, which further comprises a drain water suction pick up tube having a lower portion extending downwardly from said horizontal deck into said volume, said lower portion having an end which is spaced above the ice chest bottom during use.

12. The support structure of claim 9, wherein the length of said lower portion of said drain water suction pick up tube is less than the height of said supports under said main portion.

13. The support structure of claim 11, wherein said drain water suction pick up tube has an upper portion which extends upwardly from said horizontal deck.

14. The support structure of claim 13, wherein said upper portion of said drain water suction pick up tube comprises a nipple to which a riser tube can be connected.

15. The support structure of claim 13, wherein:
said upper portion of said drain water suction tube comprises a nipple; and which further comprises
a riser tube connected to said nipple to extend upwardly within the ice chest to facilitate connection to a suction device.

16. The support structure of claim 13, wherein:
said upper portion of said drain water suction tube comprises a nipple; and which further comprises
a drain connection tube extending through one of the walls of the ice chest near the top opening to facilitate connection to a suction device; and
a riser tube connected to said nipple, extending upwardly within the ice chest, and connected to said drain connection tube.

17. A support structure for use in combination with a portable ice chest of the type having a bottom, four walls and a top opening with a cover, said support structure comprising:
a horizontal deck for supporting food and ice within the ice chest above the ice chest bottom, a volume for melt water being defined between the ice chest bottom and said horizontal deck;
supports under said horizontal deck for positioning said horizontal deck a distance above the ice chest bottom; and
a drain water suction pick up tube having a lower portion extending downwardly from said horizontal deck into said volume, said lower portion having an end which is spaced above the ice chest bottom during use.

18. The support structure of claim 17, wherein said drain water suction pick up tube has an upper portion which extends upwardly from said horizontal deck.

19. The support structure of claim 18, wherein said upper portion of said drain water suction pick up tube comprises a nipple to which a riser tube can be connected.

20. In combination:
a portable ice chest having a bottom, four walls and a top opening with a cover; and
an adjustable support structure comprising a horizontal deck for supporting food and ice within said ice chest above said ice chest bottom, a volume for melt water being defined between said ice chest bottom and said horizontal deck;
said horizontal deck including
a generally rectangular main portion having four side edges, and
a pair of adjustable wings extending past two adjacent side edges of said main portion;
supports under said main portion for positioning said horizontal deck a distance above said ice chest bottom;
a drain water suction pick up tube having a lower portion extending downwardly from said horizontal deck into said volume, said lower portion having an end which is spaced above the ice chest bottom during use, and said drain water suction pick up tube having an upper portion which extends upwardly from said horizontal deck;
a drain connection tube extending through one of said side walls of said ice chest near said top opening to facilitate connection to a suction device; and
a riser tube connected to said nipple, extending upwardly within said ice chest, and connected to said drain connection tube.

* * * * *